April 18, 1950 F. E. PAYNE 2,504,936
CABLE PACKING

Filed Oct. 15, 1945 3 Sheets-Sheet 1

INVENTOR.
Frank E. Payne
BY
Charles F. Vaytuck
Atty

April 18, 1950  F. E. PAYNE  2,504,936
CABLE PACKING
Filed Oct. 15, 1945  3 Sheets-Sheet 2
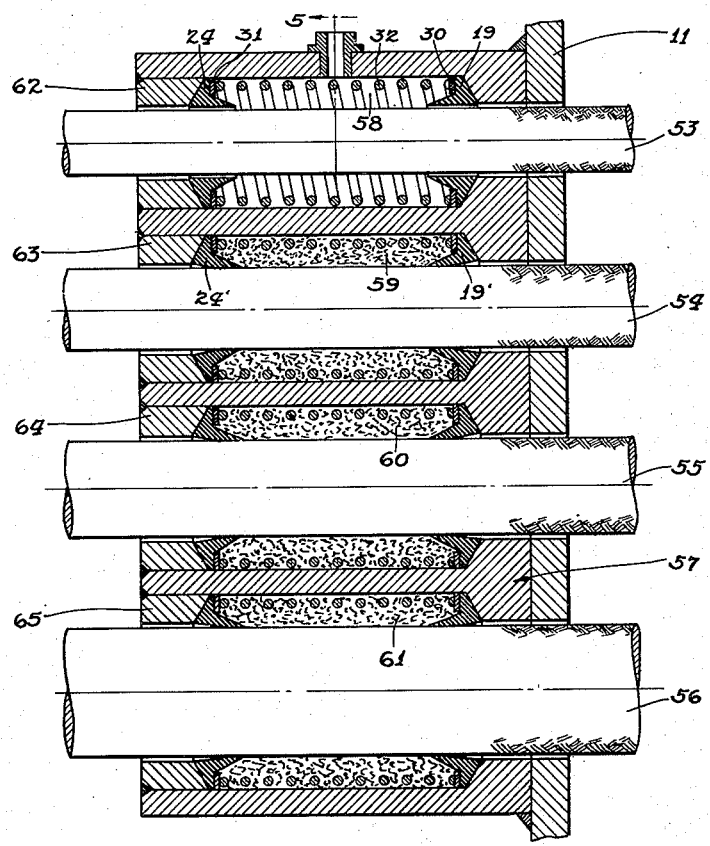
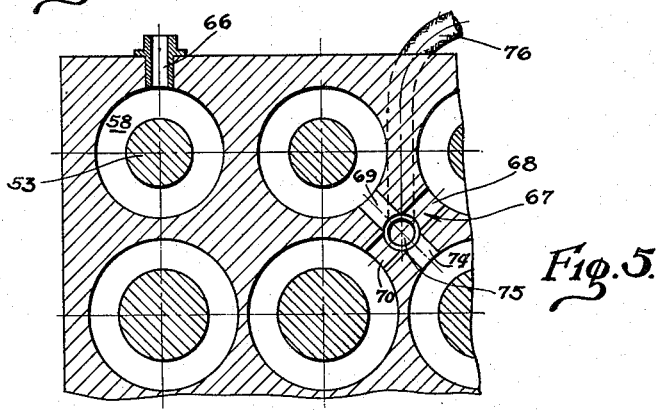
INVENTOR.
Frank E. Payne
BY
Charles P. Vajtech
Atty.

April 18, 1950  F. E. PAYNE  2,504,936
CABLE PACKING

Filed Oct. 15, 1945  3 Sheets-Sheet 3

INVENTOR.
Frank E. Payne
BY Charles F. Vnytek
Atty.

Patented Apr. 18, 1950

2,504,936

UNITED STATES PATENT OFFICE 2,504,936

CABLE PACKING

Frank E. Payne, Glencoe, Ill., assignor to Crane Packing Company, Chicago, Ill., a corporation of Illinois Application October 15, 1945, Serial No. 622,427

4 Claims. (Cl. 285—30)

This invention relates to packing for cables and conduits and particularly to a means for packing cables which are relatively inaccessible as, for example, on board ship where the cable passes through a bulkhead.

The method of packing cables on board ship as heretofore practiced comprises supplying a stuffing box for each cable, the stuffing box being of slightly greater internal diameter than the external diameter of the cable to be packed so that the cable may be drawn freely through the stuffing box. Suitable packing in ring or spiral form, or die-formed, is placed into the stuffing box around the cable and pressed against the cable by means of a threaded gland. The modern cables are covered with a protective wire mesh so that the packing must be capable of penetrating the interstices between the wire strands to form a gas-tight joint. It will be appreciated that on battleships and other naval combat vessels, the bulkhead to which the cable packing is secured is subjected to severe vibration and even distortion, and this vibration is transmitted to the packing through the stuffing box. The packing therefore must be capable of some slippage over the cable without destroying the gas-tight seal. Because the cables are closely spaced, it will be apparent that once the packed stuffing box loses its ability to hold gas, it is practically impossible to remedy this defect without disassembling the adjacent cable so that the gland of the loose packing may be turned to tighten the packing.

The principal object of this invention is to provide a means for packing one or any number of cables which pass through a wall and to maintain the packing in perfect condition at all times.

Another object of this invention is to provide a means for packing a group of cables of different sizes, using a standard block for all of the cables in the group regardless of differences in sizes of the cables in the group.

A specific object of this invention is to provide a cable packing which may be readily adapted to accommodate cables of any given ranges of sizes.

Another specific object of this invention is to provide a cable packing means wherein packing in plastic form is forced under pressure into the stuffing boxes for the cables after all of the cables in a group have been pulled through the packing means.

Yet another specific object of this invention is to provide a cable packing means for a group of cables utilizing a plastic packing which is forced into the stuffing boxes of the packing means by a pressure gun located exteriorly of the group of cables.

These and other objects and features of this invention will become apparent from the following detailed description when taken together with the accompanying drawings, in which Fig. 1 is a quarter section through a cable stuffing box incorporating this invention and showing the arrangement of parts prior to the injection of the plastic packing material into the box;

Fig. 4 is a section through a block of cable stuffing boxes;

Fig. 5 is a section taken along line 5—5 of Fig. 4 showing the means for injecting the packing into a plurality of stuffing boxes simultaneously.

Figure 1:
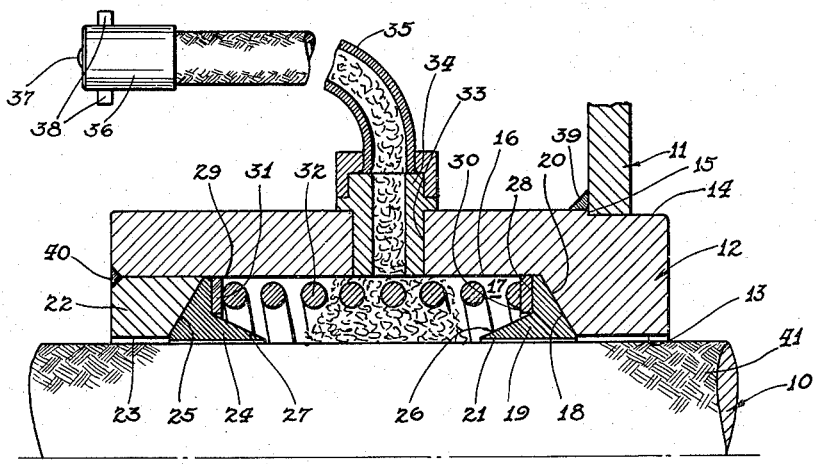

Referring now to the drawings for a more detailed description of the invention, and particularly to Fig. 1, there is disclosed a cable or other flexible conduit 10 which is required to be passed through a bulkhead 11 or other partitioning wall, and a stuffing box 12. Said stuffing box 12 is comprised of a cylinder having an opening 13 therein, the diameter of which is larger than the external diameter of cable 10, a stepped portion 14, the shoulder 15 of which abuts bulkhead 11, and a hollowed-out portion 16 forming a chamber 17 between said hollowed-out portion 16 and the exterior of cable 10. The right-hand (Fig. 1) wall 18 of chamber 17 may be radial, but is preferably made conical to receive a flexible resilient end ring 19 which has a corresponding conical surface 20. Said ring 19 has an internal diameter 21 which is greater than the external diameter of cable 10 in order to permit the cable to be readily pulled through the ring. The left-hand end (Fig. 1) of stuffing box 12 is closed by a metal ring 22 having an internal diameter 23 which is greater than the external diameter of cable 10 and approximates the internal diameter opening of 13. A ring 24, similar in every respect to ring 19, is located adjacent closure ring 22, the latter being provided with a conical surface 25 having a slope opposite to that of conical surface 18 and receiving ring 24 thereagainst. The end rings 19 and 24 may be endless or, if desired, may be split.

Each end ring 19 and 24 is formed with an axially extending tapered lip 26 and 27, respectively, and with a radially disposed side 28 and 29, respectively. Adjacent radially disposed sides 28 and 29 are ferrules 30 and 31, respectively, which are held in position by a spring 32 compressed between ferrules 30 and 31.

Located at any convenient point intermediate ferrules 30 and 31 is an opening 33 which is provided with a fitting 34 to receive a flexible pipe connection 35. The interior of pipe 35 is thus in direct communication through fitting 34 with chamber 17. Flexible pipe 35 terminates in a fitting 36 provided with a suitable check valve 37 to hold the pressure in pipe 35 and stuffing box 12, and with pins 38 to receive the end of a pressure gun.

To simplify the construction of the box 12, it is preferably welded as at 39 to bulkhead 11 and at 40 to ring 22 so that the ring may be removed if desired by simply chipping away the weld material 40, and stuffing box 12 may be removed from bulkhead 11 by removing the weld material 39. It will be noted that cable 10 is provided with a woven wire sheath 41 which of course increases the difficulty of effecting a gas-tight seal between the cable and bulkhead 11.

The rings 19 and 24 as well as the ferrules 30 and 31 and spring 32 are preferably assembled in stuffing box 12 before said stuffing box is welded to bulkhead 11. This is done by first inserting end ring 19 then ferrule 30 which of course will be centered by the wall of chamber 17, and then spring 32 is dropped into place. After this is done, ferrule 31 is dropped over the end of spring 32, ring 24 is inserted behind ferrule 31 and finally ring 22 is pressed into place and welded. It is contemplated that the weld will consist of a few small spots of just sufficient strength to withstand the pressure created by the packing. Ring 22 will not be subjected to welding temperature sufficiently long to cause end ring 24 to become overheated. It will be recalled that end ring 24 is made of resilient deformable material which may be some form of rubber, either natural or synthetic, and this material of course cannot safely withstand temperatures much higher than 200° Fahrenheit. The assembled stuffing box is then inserted into the opening provided for it in bulkhead 11 and welded thereto.

Figure 2:
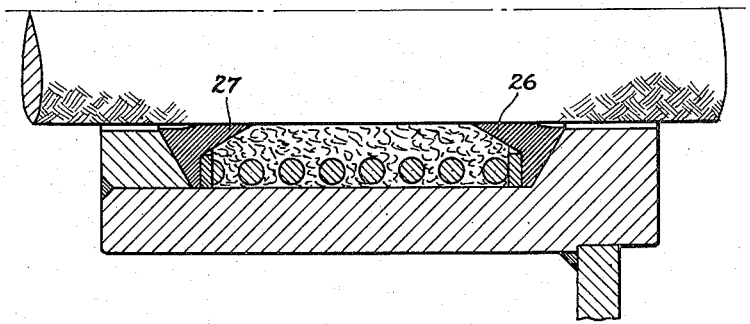
Fig. 2 is a quarter section of the stuffing box of Fig. 1, showing the disposition of the parts therein after the plastic packing has been injected into the stuffing box.

Referring now to Fig. 2, the stuffing box is shown with the packing material in place under pressure. It will be noted that the lip portions 26 and 27 of end rings 19 and 24 have been forced radially inwardly by the pressure of the packing material into firm contact with the sheath 41 of cable 10. This prevents the packing material from escaping through the space provided between the cable 10 and the openings 13 and 23 through which the cable must be drawn. The packing material itself may be a mixture of cork, graphite, mineral oil and a polyisobutylene binder having a relatively high molecular weight. This will produce a packing which is quite tacky and which will penetrate into the interstices between the woven wire sheath and which will also adhere thereto so as to form a gas-tight seal. In place of the cork, sawdust and wood particles may be used, and grease and oils other than mineral oil may be substituted for the mineral oil. Similarly rubber-like binders of a consistency like that of polyisobutylene may be used instead of the polyisobutylene. The pressure to which the packing material is subjected will depend largely upon the nature of the material itself. For the first-mentioned material I have found that 400 pounds per square inch is satisfactory.

Figure 3:
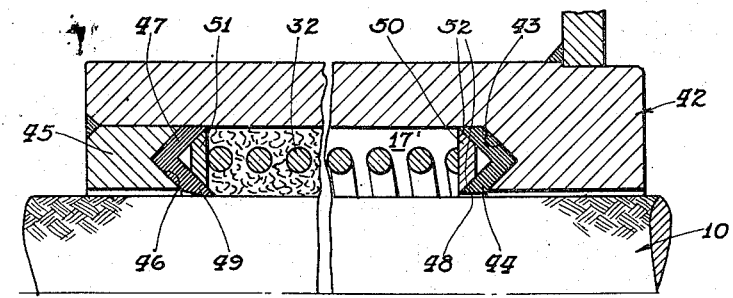
Fig. 3 is a modification of the end ring of the stuffing box of Fig. 1.

In the form shown in Fig. 3, the stuffing box 42 has been modified over that shown in Fig. 1 so that instead of the conical surface 18 there is a V-shaped groove 43 into which is fitted a correspondingly V-shaped ring 44 made of suitable flexible material such as rubber, either synthetic or natural, leather, or the like. Similarly, the closure ring 45 is provided with a V-shaped groove 46 into which is fitted a ring 47 which may be identical in every respect to ring 44. Each ring 44 and 47 is provided with a tapered lip portion 48, 49, respectively, and is held in place in the corresponding V-groove by ferrules 50 and 51 respectively. These ferrules have tapered edges as shown for example at 52 which cooperate with the internal surfaces of the end rings 44 and 47 to provide a surface-to-surface contact therebetween. The spring 32 maintains ferrules 50 and 51 in contact with rings 44 and 47 while the cable 10 is being drawn through the stuffing box. As in the Fig. 1 design, it will be noted that the lip portions 48 and 49 are initially spaced from cable 10 so that the latter may be freely drawn through the stuffing box. The condition of the stuffing box after the cable has been drawn through it, but before the packing has been extruded into the chamber 17' is shown in the right-hand portion of Fig. 3. The condition of the stuffing box after the packing has been extruded into chamber 17' is shown in the left-hand portion of Fig. 3. It will be observed in the said left-hand portion that after the packing has been introduced under pressure the lip 49 will be bent radially inwardly by the pressure of the packing and hence will prevent the escape of the packing from the chamber 17' through the space normally provided between cable 10 and ring 45.

The packing used in the Fig. 3 form may be the same as that used in the Fig. 1 form and the method of introducing it into chamber 17' may be identical with that shown in Fig. 1 and accordingly no detailed description of the flexible tube and fitting need be given with respect to Fig. 3. It should be noted that the V-shaped rings 44 and 47 when used with ferrules such as 50 and 51 and a spring 32 will maintain their proper shape and location before, during and after the packing material has been introduced into the chamber. Thus it would be substantially impossible for the packing material to find its way behind the ring and into the V-grooves 43 and 46 since the ferrules have a stiffening effect upon the open end of the V-ring.

Fig. 4 shows a plurality of cables 53, 54, 55 and 56 of different sizes all passing through a bulkhead 11. Instead of a single stuffing box 12 as shown in Fig. 1, a plurality of stuffing boxes is provided, the stuffing boxes being formed from a single block 57 which may be cast or die-formed to provide suitable openings for each cable and a suitable chamber 58, 59, 60 and 61 for each of the cables, 53, 54, 55 and 56, respectively. Either the Fig. 1 or Fig. 3 forms of end rings may be used but, for purposes of illustration, the Fig. 1 form is shown with the block 57 of Fig. 4. Thus each of the chambers is closed off by a ring 62, 63, 64 and 65 each of which is preferably welded into the chamber to which it is applied after the appropriate end rings 19 and 24, or their equivalent in larger sizes for the chambers 59, 60 and 61 have been put into place with a spring 32. With the end rings welded in place the cables are then drawn through the stuffing boxes so formed and the packing is extruded into the various boxes.

Figure 6:
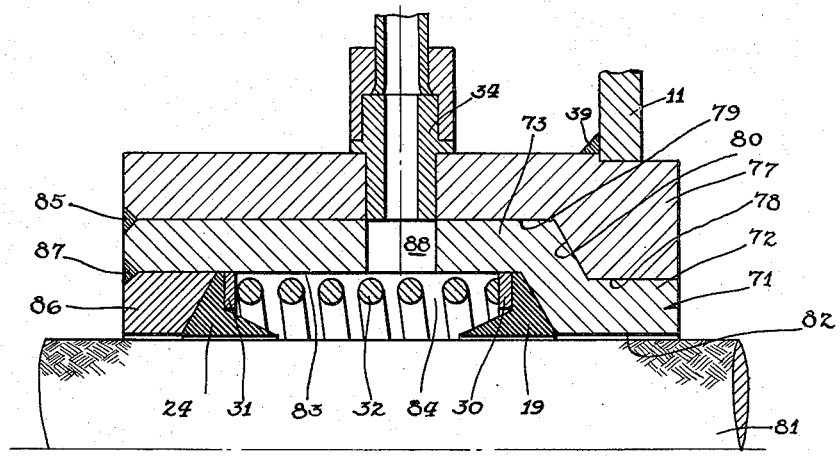
Fig. 6 is a modification of the stuffing box of Fig. 1 showing how a single size of box can be modified by means of an adaptor to receive different sizes of cable.

Fig. 5 shows how the several stuffing boxes may be reached for filling with a packing under pressure. Where the stuffing box is relatively accessible as for example, one located at the edge of the box such as the one for cable 53, access to the chamber 58 may be had through opening 66 which is provided with a pipe connection to which a flexible tube or a fitting such as 36 of Fig. 1, may be secured directly. Where there are many cables in a block so that certain ones are not readily accessible without having to pass through the space between the outer rows of cables, the openings to the respective chambers may be cored as shown at 67. In this case each of the openings 68, 69, 70 and 74 meets in a common chamber or passageway 75 to which is secured a flexible pipe 76 passing upward to the edge of the block where it may be readily reached by a pressure gun. It is understood of course that an individual flexible tube can be used with each of the openings 68, 69, 70 and 74 if desired so that individual control of each stuffing box may be possible. It is understood further that these flexible tubes 76 will be installed prior to the pulling of the cables through the respective stuffing boxes.

Where it is not known beforehand the exact diameter of the cable to be passed through any one stuffing box, all of the stuffing boxes will be made of a maximum diameter and then altered to fit the diameter of the cable actually passed therethrough. Fig. 6 shows how this may be accomplished. In this figure there is shown a stuffing box 77 secured to a bulkhead 11 by a weld 39, said stuffing box 77 having an opening 78 adapted to receive the largest size cable which it is expected to encounter. The normal stuffing box chamber is then defined by an enlarged opening 79 connected to the smaller opening 78 by a conical surface 80. Since the cable 81 actually passed through stuffing box 77 is of a much smaller diameter than the diameter of opening 78, an adaptor 71 is used. This adaptor is provided with a main body portion 73 which fits snugly within the enlarged opening 79, and a neck or reduced portion 72 which fits snugly into the smaller opening 78. The adaptor 71 is itself provided with an opening 82 which is slightly larger in diameter than the external diameter of the cable 81 to be sealed and with an enlarged opening 83 which with cable 81 forms a chamber 84 for the reception of packing. Adaptor 71 is secured to stuffing box 77 by means of a weld 85, preferably continuous, which may be readily chipped out in order to remove the adaptor. Similarly the chamber 84 is closed off at the left-hand end (Fig. 6) by a ring 86 which is secured by a weld 87 to adaptor 71. The interior of chamber 84 is provided with end rings 19 and 24 as in Fig. 1 which are retained by ferrules 30 and 31 separated by a spring 32. An opening 88 in adaptor 71 provides communication between chamber 84 and the fitting 34 through which the packing is injected into chamber 84.

Thus, any individual stuffing box can be made to receive a smaller cable by the simple expedient of using an adaptor such as the one shown at 71 in Fig. 6. Where the multiple stuffing box is designed for a particular ship so that the number and sizes of cable to be accommodated is known with considerable accuracy, the block may be formed as a unit with the stuffing boxes of approximately the correct size, this being done either by casting the block with all openings of the same diameter, the diameter being the largest expected, and then inserting appropriate adaptors into each opening, or by forming the block initially with the stuffing boxes of the differing diameters located in proper relation to one another. Any changes that must be made after the stuffing boxes are installed can be made by removing one adaptor and substituting for it another, or by replacing the entire block. The former method would of course entail the least disturbance of cable already installed.

It will be apparent from the foregoing description that the stuffing box for cables and the like made in accordance with this invention can be modified readily to meet existing conditions and, most important of all, can always be kept filled with the proper amount of packing under pressure. Once installed, all that is necessary to maintain a proper seal is to apply a pressure gun containing the proper packing material to the readily accessible fitting or fittings without removing or in any way altering the position of any of the cables. It is also apparent that if it is decided to change the size of one of the cables after the design of the boxes has been substantially completed and the stuffing boxes themselves have been installed, such a change can be made readily by moving the appropriate adaptor to reduce the size of the opening to that desired.

The foregoing description is merely illustrative of preferred embodiments of this invention and the scope of the invention therefore is not to be limited thereto but is to be determined by the appended claims.

What is claimed is:

1. A packing for providing a fluid-tight joint between a cable and a wall through which the cable extends, said packing comprising a stuffing box supported from the wall and having an opening to receive the cable, the opening being slightly larger than the cable to permit the cable to be pulled through the stuffing box, means in the stuffing box deformable under fluid pressure to seize the cable, but normally substantially larger than the cable to permit free passage of the cable through the said means, and means for introducing a plastic packing into the stuffing box under pressure, said plastic packing contacting the deformable means to cause the deformable means to seize the said cable and form in conjunction with the packing a fluid-tight joint.

2. A packing for providing a fluid-tight joint between a cable and a wall through which the cable extends, said packing comprising a stuffing box supported from the wall and having an opening to receive the cable, the opening being slightly larger than the cable to permit the cable to be pulled through the stuffing box, rings in the stuffing box at opposite ends of the opening, the rings being deformable under fluid pressure to seize the cable, but normally substantially larger than the cable to permit free passage of the cable through the said means, and means for introducing a plastic packing into the stuffing box under pressure, said plastic packing being introduced between the rings and deforming the rings in a manner to cause them to seize the cable and form in conjunction with the packing a fluid-tight joint.

3. A packing for providing a fluid-tight joint between a cable and a wall through which the cable extends, said packing comprising a stuffing box supported from the wall and having an opening to receive the cable, the opening being slightly larger than the cable to permit the cable to be pulled through the stuffing box, spaced resilient rings in the stuffing box, each ring having an axially extending lip which is tapered and readily deformable so as to seize the cable, but normally of a size sufficiently large to permit the passage of the cable therethrough, and means for introducing a plastic packing between the rings, said plastic packing contacting the tapered lips to cause said lips to seize the said member and form a fluid-tight joint.

4. A packing as described in claim 3, and resilient means for holding the rings in their spaced relation while the cable is being pulled through the rings.

FRANK E. PAYNE.

REFERENCES CITED

The following references are of record in the file of this patent:

UNITED STATES PATENTS

| Number | Name | Date |
|---|---|---|
| 1,590,580 | Hume | June 29, 1926 |
| 2,104,355 | Rupp et al. | Jan. 4, 1938 |
| 2,273,129 | Messinger | Feb. 17, 1942 |
| 2,394,609 | Hardesty | Feb. 12, 1946 |

FOREIGN PATENTS

| Number | Country | Date |
|---|---|---|
| 772,970 | France | Nov. 9, 1934 |